United States Patent [19]

Scola

[11] 4,412,884
[45] Nov. 1, 1983

[54] ADHESIVE BONDING METHOD EMPLOYING DIENE BIS-IMIDE POLYMERS

[75] Inventor: Daniel A. Scola, Glastonbury, Conn.

[73] Assignee: United Technologies Corporation, Hartford, Conn.

[21] Appl. No.: 365,744

[22] Filed: Apr. 5, 1982

Related U.S. Application Data

[62] Division of Ser. No. 273,139, Jun. 12, 1981, Pat. No. 4,354,012.

[51] Int. Cl.³ .............................................. C09J 5/02
[52] U.S. Cl. .............................. 156/307.3; 156/331.5; 428/473.5; 526/262; 528/322; 528/367; 528/423
[58] Field of Search .......................... 156/307.3, 331.5; 528/322, 423, 367; 526/259, 262; 428/473.5

[56] References Cited

U.S. PATENT DOCUMENTS

| | | | |
|---|---|---|---|
| 2,706,720 | 4/1955 | Cardwell | 526/262 |
| 3,369,055 | 2/1968 | Salyar et al. | 526/259 |
| 3,380,964 | 4/1968 | Grundschober et al. | 260/47 |
| 3,406,148 | 10/1968 | Sambeth et al. | 260/47 |
| 3,450,711 | 6/1969 | Megna et al. | 260/326 |
| 3,533,996 | 10/1970 | Grundschober et al. | 526/262 |
| 3,632,428 | 1/1972 | Lubowitz et al. | 526/259 |
| 3,678,073 | 7/1972 | Borden et al. | 260/326 |
| 3,717,615 | 2/1973 | Holub et al. | 260/78 |
| 3,759,779 | 9/1973 | Dumas | 156/331 |
| 3,761,430 | 9/1973 | Witzel | 260/2.5 B |
| 3,996,203 | 12/1976 | Hand et al. | 428/473.5 |
| 4,011,386 | 3/1977 | Matsumoto et al. | 526/259 |
| 4,043,986 | 8/1977 | Gruffaz et al. | 260/78 |

OTHER PUBLICATIONS

Stille, J. K. et al., "Polymerization by the Diels-Alder Reaction", J. Org. Chem., vol. 26, pp. 4026–4029, 1961.
Furdik, M. et al., Chem. Zvesti, vol. 17(1), pp. 31–40, 1963.
Serafini, T. T. et al., "Thermally Stable Polyimides from Solutions of Monomer Reactants", J. Applied Polymer Science, vol. 16, pp. 905–915, 1972.
Serafini, T. T. et al., "A Review of Processable High Temperature Resistant Addition-Type Laminating Resins", Applied Polymer Symposium, No. 22, pp. 89–100, 1973.
St. Clair, A. K. et al., "Structure-Property Relationships of Isomeric Addition Polyimides Containing Nadimide End Groups," Polymer Engineering and Science, vol. 16, No. 5, pp. 314–317, May 1976.

Primary Examiner—John J. Gallagher
Attorney, Agent, or Firm—Harry J. Gwinnell

[57] ABSTRACT

A moisture resistant polyimide adhesive is disclosed comprising a polymer having repeating units of the formula:

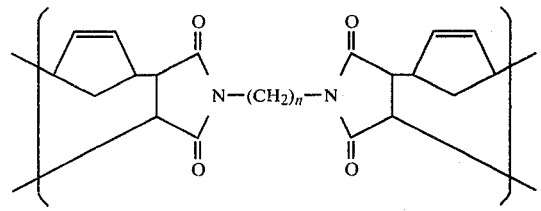

where n is equal to about 8 to about 20. The improved moisture resistance of the polymers according to the present invention is indicated by a moisture pick-up of less than about 0.6% by weight after 24 hour immersion in room temperature water. The polymer also exhibits a tensile strength greater than about 1800 psi ($1.24 \times 10^7$ NT/M²). In addition to their improved adhesive and moisture resistant properties, the polymers according to the present invention exhibited such properties with cure times of less than about one hour at temperatures up to about 320° C.

3 Claims, 3 Drawing Figures

ADHESIVE BONDING METHOD EMPLOYING DIENE BIS-IMIDE POLYMERS

This is a division of application Ser. No. 273,139 filed on June 12, 1981, now U.S. Pat. No. 4,354,012.

TECHNICAL FIELD

The field of art to which this invention pertains is synthetic resins from monomers containing a nitrogen atom as part of a heterocyclic ring, and specifically polyimides, and adhesive bonding using such resins.

BACKGROUND ART

Synthetic resins are known to form strong adhesive bonds with many materials. In fact, it is these strong adhesive properties which have made one such polymer system, the epoxies, generally a matrix material of choice for forming fiber reinforced composites. However, fiber reinforced epoxy resin composite materials lose their elevated temperature mechanical properties, and in some instances, their room temperature mechanical properties on exposure to natural conditions such as heat, sunlight, and moisture over time periods ranging from a few months to several years. This is true even for composites containing not only popular and well known commercially available epoxies, but even to some extent, for composites containing conventional polyesters, polysulfones and polyimides as well. And while there are many patents directed to polyimide resin materials, very little attention has been directed to their specific functionality and its effect on improving the properties for which these resin compositions have their most popular use. Note for example, U.S. Pat. Nos. 3,380,964; 3,406,148; 3,450,711; 3,678,073; 3,717,615; 3,759,779; 3,761,430; 4,011,386; and 4,043,986.

DISCLOSURE OF INVENTION

The present invention is directed to moisture resistant polyimide adhesives formed by cross-linking aliphatic diene bis-imides of the formula:

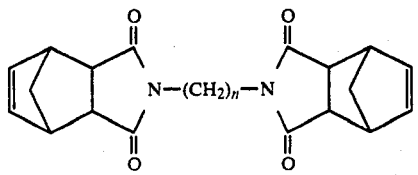

to form repeating polymer units of the formula:

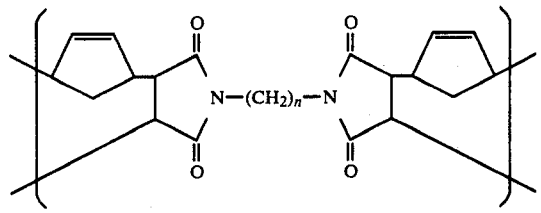

where n is about 8 to about 20. Limiting the aliphatic chain to this length surprisingly produces improved moisture resistance and tensile lap shear strength with cure times less than about one hour. Polymer moisture absorption is less than about 0.6% by weight (based on weight of polymer) after 24 hour immersion in distilled water at room temperature and tensile lap shear strength is greater than about 1800 psi ($1.24 \times 10^7$ NT/M$^2$).

Another aspect of the present invention includes adhesive bonding processes utilizing such polymers with cure times of less than about one hour.

The foregoing, and other features and advantages of the present invention will become more apparent from the following description and accompanying drawing.

BEST MODE FOR CARRYING OUT THE INVENTION

Figure 1:
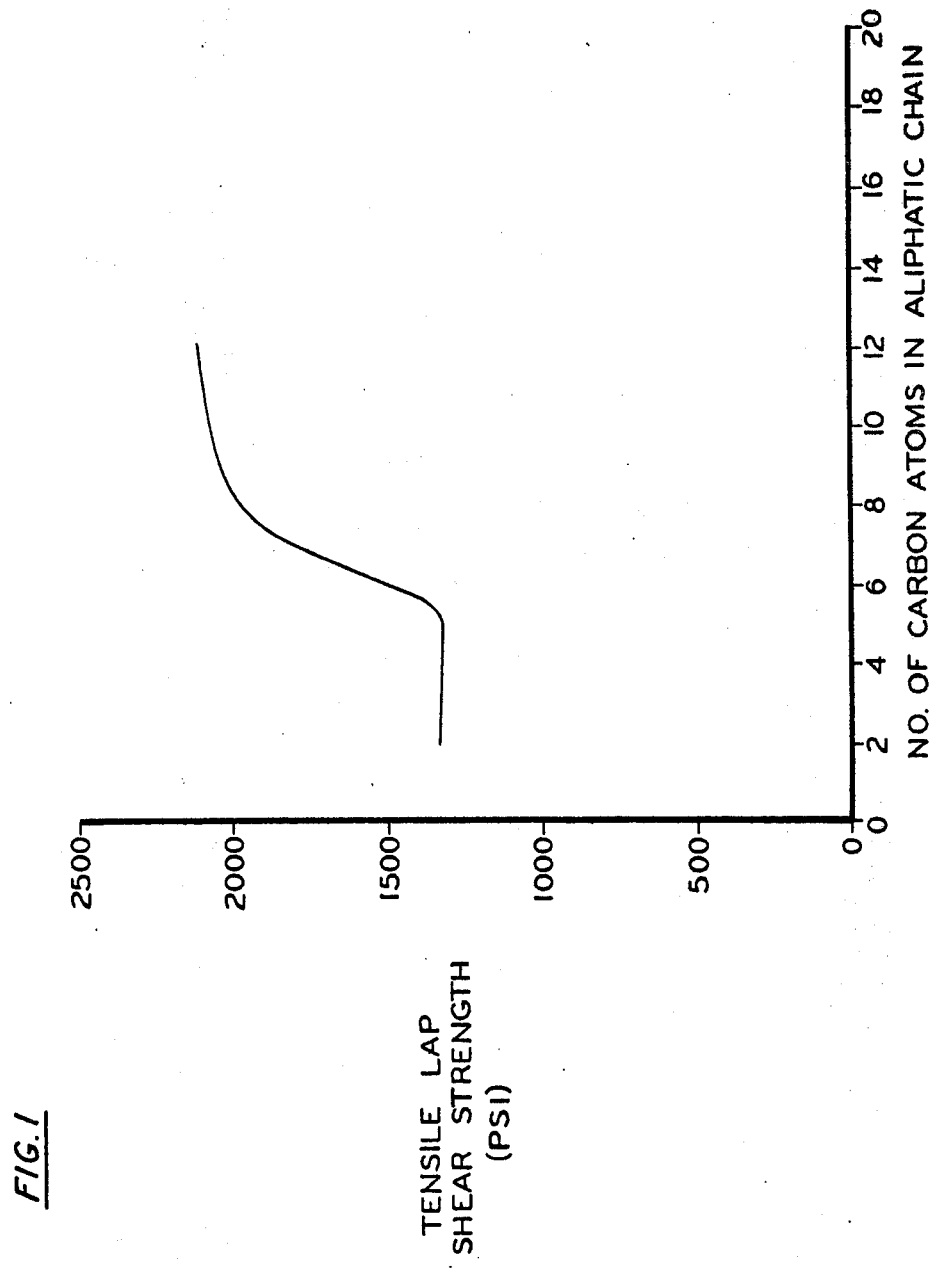
FIG. 1 shows the tensile strength of polyimides according to the present invention as a function of the length of the aliphatic chain.

As described above, state of the art resins, such as epoxies, polyesters and to a lesser extent, polysulfones and polyimides, do not stand up at elevated temperatures in mechanical properties and moisture resistance. Those polymers which have exhibited mechanical strength and moisture resistance lack adhesive characteristics, such as polytetrafluoroethylene, polyethylene and polypropylene. And those resins which have excellent adhesive characteristics, because of their high degree of polarity, suffer in poor moisture resistance. Examples of these materials are epoxies, polyesters, and polyacrylates. However, it has been found that with the proper placement and balance of polar groups such as

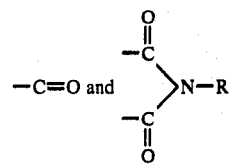

and non polar groups such as

(where n=about 8 to about 20) in the polyimides according to the present invention not only is moisture resistance improved, but adhesive and mechanical properties are improved as well. The monomers which produce the improved polymers according to the present invention are represented by the formula:

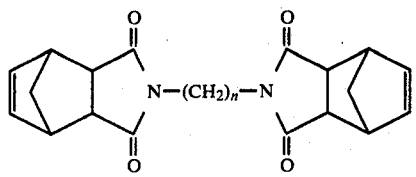

where R is (CH$_2$)$_n$, and n is about 8 to about 20.

These monomers are prepared by reacting 5-norbornene-2,3-dicarboxylic acid anhydride with aliphatic diamines of the formula

where n is about 8 to about 20 (and preferably about 8 to about 12) in a molar ratio of about 2.2 to 1.8:1, and preferably 2:1.

EXAMPLE

One hundred thirty one grams (0.8 mole) of 5-norbornene, 2, 3 dicarboxylic acid anhydride is added to a solution of 80 grams of 1, 12-dodecanediamine (0.4 mole) in 150 ml of dimethylformamide (DMF) held at a temperature of 65° C., the addition taking place over a period of about one hour. This is followed by heating the reaction mixture for two hours at reflux temperature (about 140° C.-150° C.). The mixture is cooled to 20° C.-25° C. and the crystal-like solid monomer that forms on cooling is filtered off. In cases where no crystals form, for example where n is equal to 9, the solvent is removed, the resulting oil purified by boiling it in methylene dichloride solution with decolorizing charcoal. The purified oil crystallized on cooling to −10° C. after removal of solvent.

The monomer crystals recovered from the first crystallization can be purified by recrystallizing from an alcohol such as ethanol or from alcohol/DMF mixtures. The purification solvent is shown in Table I, along with melting points and yields. The ability of the diene bisimide to form a hard polymeric material on heating between about 250° C. and about 300° C. in less than about one hour is also noted. Preferred curing is at 275°–300° C.

TABLE I

| Monomer Aliphatic Chain Length n = | Melting Point °C. | Purification Solvent | % Yield | Ability to Thermally Polymerize in Air at 250° C.–300° C. |
|---|---|---|---|---|
| 8 | 109–109.5 | ethanol | 50 | yes |
| 9 | 64–65.5 | ethanol | 39 | yes |
| 10 | 89.5–90.5 | ethanol | 47 | yes |
| 12 | 80–82 | ethanol | 60 | yes |

The progress of the polymer forming reaction is followed by observing the physical state of the reaction mixture. As the cross-linking progresses, the reaction mixture changes from a clear liquid to a gel after about 30 to 45 minutes of heating, and from a gel state to a solid polymer from 45 minutes to an hour after heating.

The polymers according to the present invention have particular utility as hot melt adhesives to bond any surfaces together, and in fact when used to bond glass to another surface, the polymer forms a stronger bond to the polymer than the cohesive strength of the glass itself. The polymers of the present invention are also useful as a matrix material in the formation of fiber (such as graphite) reinforced composites, and as electrical insulation material. The polymers according to the present invention can also be applied as protective (e.g. insulative) coatings to various substrates such as metal, wood, or glass, or used to bond one or more of such substrates together. The bonding procedures would be those as conventionally used in this art including applying the monomer or prepolymer either as a powder or from solution in an organic solvent such as chloroform to at least one surface to be bonded in sufficient amount to effect such bonding, placing the surfaces to be bonded together with the adhesive in between (with or without external pressure) and heat curing as described herein, producing a specimen with a polymer bond thickness of preferably about 0.004 to 0.008 mil thick.

A comparison of the polymers according to the present invention with conventional polyimides adhesives such as PMR-11 and PMR-15 sold by Ferro Corp., Culver City, Calif.; Fiberite Corp., Winona, Wis.; Narmco (Div. of Celanese), Calif.; and U.S. Polymeric, Santa Ana, Calif. demonstrated comparable mechanical properties and moisture resistance with the advantage of much reduced cure times under comparable conditions. By curing is meant effecting a thermo-setting, retrograde Diels-Alder cross-linking reaction between the monomers. The improved cure times refer to heat applications at temperatures of about 250° C. to about 320° C. in the absence of a catalyst. It is also noteworthy that the system of the present invention comprises just a monomer composition as opposed to the three component composition of the PMR 11 and 15 series consisting of 5-bicyclo[2.2.1]heptene-2,3-dicarboxylic acid monomethyl ester, 4,4'-methylenedi-aniline (MDA), and dimethyl ester of 3,3,4,4'-benzophenone-tetracarboxylic acid. Generally, in this series, the three monomers are mixed in solution prior to curing for correct stoichiometry and the solvent evaporated. Whereas, with the present invention, the monomer may be applied by itself unpolymerized or prepolymerized (just short of its gel state) in powder form or in solution.

The following testing was performed to demonstrate the superior properties of the adhesives according to the present invention. Tensile lap shear strengths were measured on specimens prepared from two pieces of aluminum (conventionally etch pretreated) 2.54 cm wide×7.62 cm long×0.31 cm thick bounded together in a 0.5 inch (12.7 mm) overlap area. The specimens were prepared by coating a 0.75 inch (19.05 mm) section with a 10% solution of the resin prepolymerizied but still in solution in chloroform. The coated aluminum sections were treated in a vacuum at room temperature for one-half hour. The two coated sections were placed together to form a 0.5 inch (12.7 mm) overlap. Stainless steel spacers (thickness 0.15 mm, 6 mil) were positioned in the fixture holding the lap shear specimens to maintain 0.015 cm (6 mil) cure bond line. The specimens were placed in a preheated press at 316° C. When the specimens reached a temperature of 275° C., a pressure of 0.414 MPa (60 psi) was applied. The specimens were allowed to reach 316° and were maintained at 316° C., 0.414 MPa, for one hour. Measurements were made on a Tinius-Olsen Universal testing machine at a crosshead speed of 0.127 cm/min (0.05 in./min).

The results are shown in FIG. 1. A dramatic increase in lap shear strength can be seen to occur when the number of carbon atoms in the aliphatic chain reaches about 8. This dramatic increase in adhesive strength is surprising since the shorter chain length monomers have a shorter distance between imide polar groups than the longer chain length monomers. Therefore, the polarity of the longer chain length resins should be lower than the polarity of the shorter chain length resins, thereby resulting in decreased surface adhesion. However, the short distances between the shorter chain length monomers cause a higher cross-link density than the polymers for longer chain length monomers. The higher densities of the shorter chain length monomers is evidence of this higher cross-link density. Note Table II. The higher cross-link density generates a more brittle polymer system which appears to have a greater influence in controlling the the adhesive properties than the polarity of the polymer system.

TABLE II

| Monomer Aliphatic Chain Length n = | Density g/cm³ |
| --- | --- |
| 2 | 1.31 |
| 3 | 1.30 |
| 4 | 1.28 |
| 5 | 1.27 |
| 6 | 1.24 |
| 7 | 1.23 |
| 8 | 1.25 |
| 10 | 1.21 |
| 12 | 1.17 |
| PMR-11 | 1.28 |
| PMR-15 | 1.29 |

Figure 2:
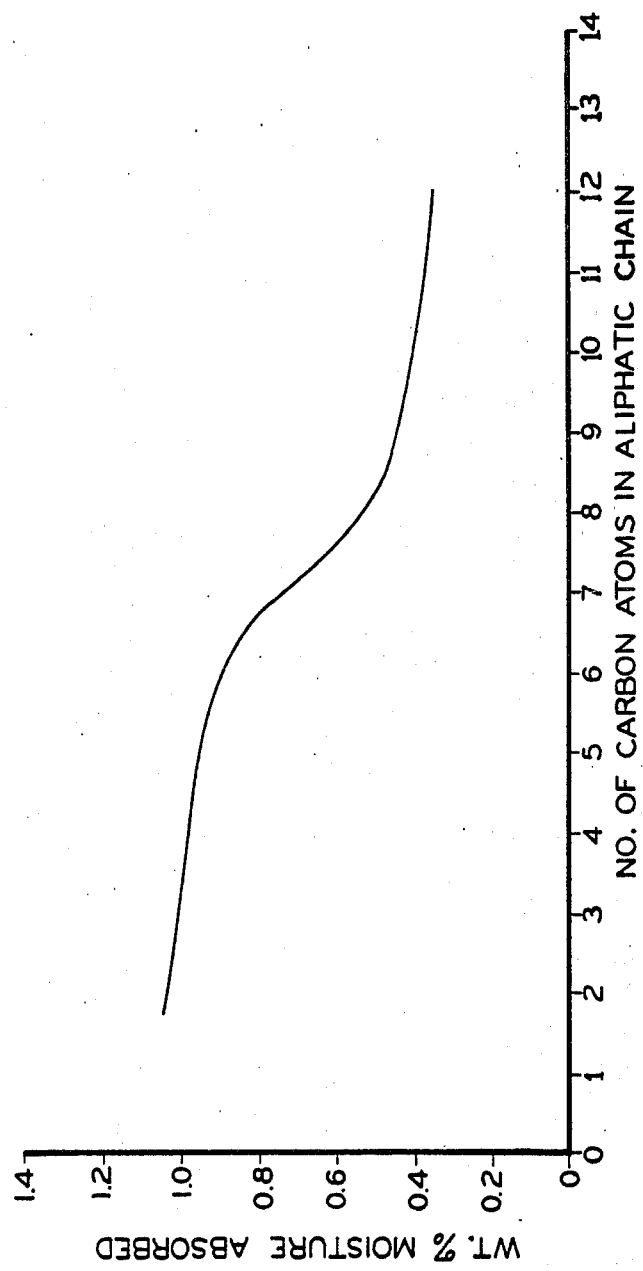
FIGS. 2 and 3 show moisture resistance of polyimides according to the present invention as a function of the number of carbons in the aliphatic chain.
Figure 3:
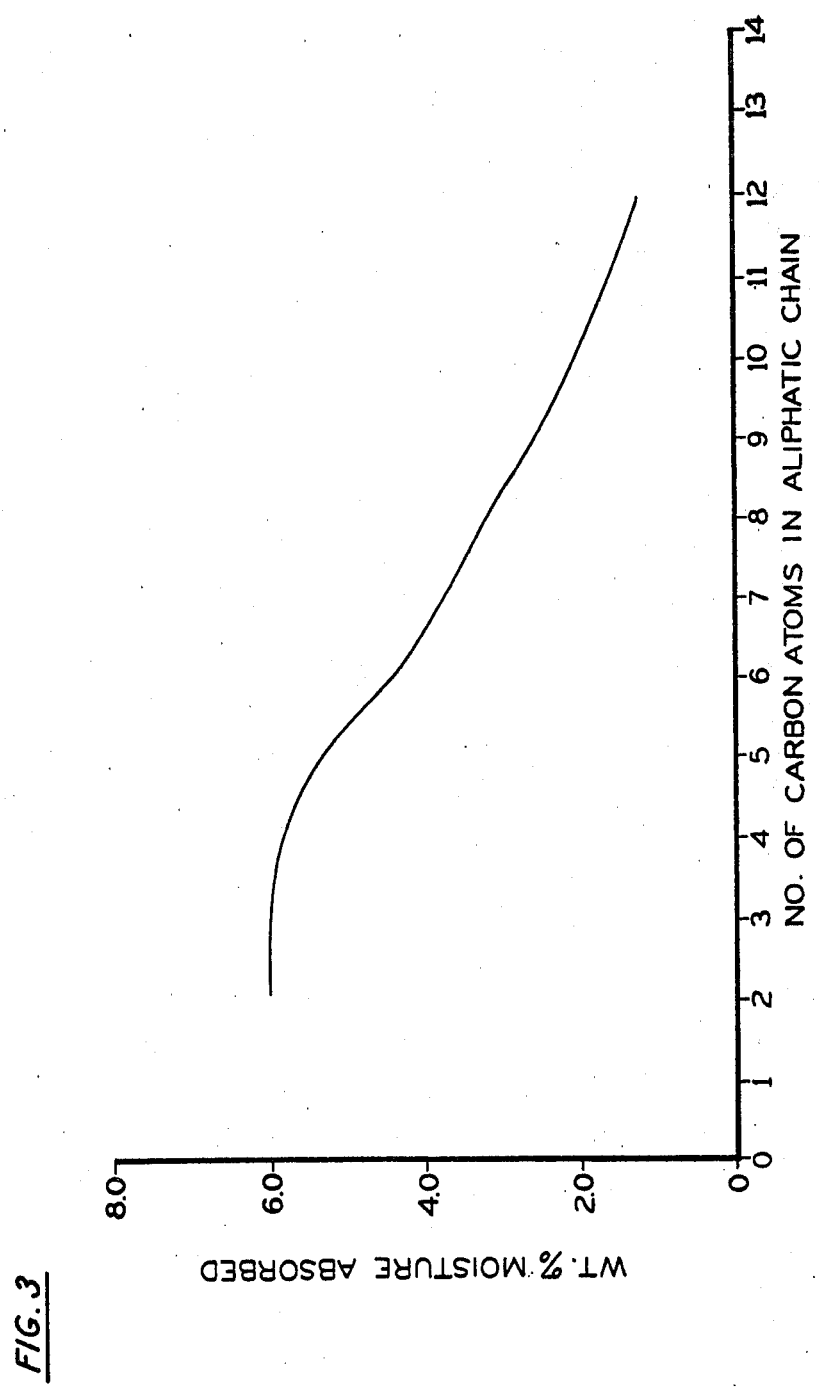

In the moisture absorption testing performed, samples (weighing approximately 0.5 g) of the polymers were cut from molded disks approximately 1 inch (2.54 cm) in diameter and 0.25 inch (0.64 cm) thick. These samples were then immersed in distilled water at room temperature for 24 hours and the weight percent of moisture absorbed (based on the weight of the polymer) recorded (ASTM D570-D59aT). The results are shown in FIG. 2. Again, at about n=8 a dramatic decrease was noted which continued up to about n=12. This should continue at least up to n=20. Similar moisture absorption testing was performed in boiling water for 168 hours (FIG. 3). The results were similar to those observed in FIG. 2.

As stated above, not only do the adhesives according to the present invention exhibit increased adhesive strength and moisture resistance, but the present systems are unique in that they can be processed as hot melt adhesives at about 250° C. to about 320° C. in a very short time, i.e. one-half hour to an hour, as compared to the 3 or more hours generally necessary for the conventionally used epoxy adhesives, and PMR-15 polyimide which generally requires a two-hour cure (at 316° C.). This time-saving results not only in improved manpower and manufacturing efficiency, but energy savings as well.

It should also be noted that not only is there an improvement in mechanical properties for the adhesives according to the present invention, but this improvement shows up even at temperatures in the order of 400° F. (204° C.).

Although this invention has been shown and described with respect to detailed embodiments thereof, it will be understood by those skilled in the art that various changes in form and detail thereof may be made without departing from the spirit and scope of the claimed invention.

I claim:

1. A method of adhesion bonding two or more surfaces together comprising applying to at least one surface a moisture resistant polyimide adhesive formed by polymerizing monomers of the formula:

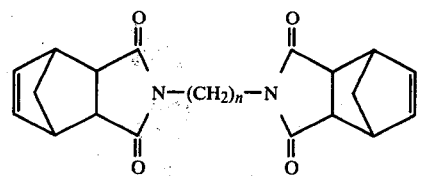

to form a polymer with repeating units

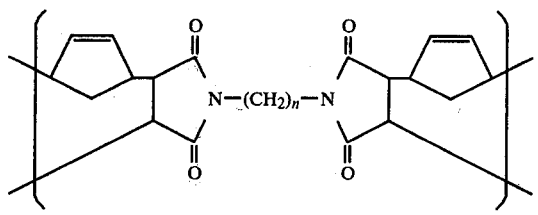

where n is about 8 to about 20, and the polymer has a room temperature water immersion moisture absorption rate less than about 0.6% by weight for 24 hours and a tensile lap shear strength greater than about 1800 psi ($1.24 \times 10^7$ NT/M²), such properties imparted to the polymer with curing for less than about one hour, followed by placing the two surfaces together with the adhesive in-between and curing for less than about one hour at about 250° C. to about 320° C.

2. The method of claim 1 where n is about 8 to about 12.

3. The method of claim 1 wherein n is about 12 to about 20.

* * * * *